United States Patent Office 3,485,768
Patented Dec. 23, 1969

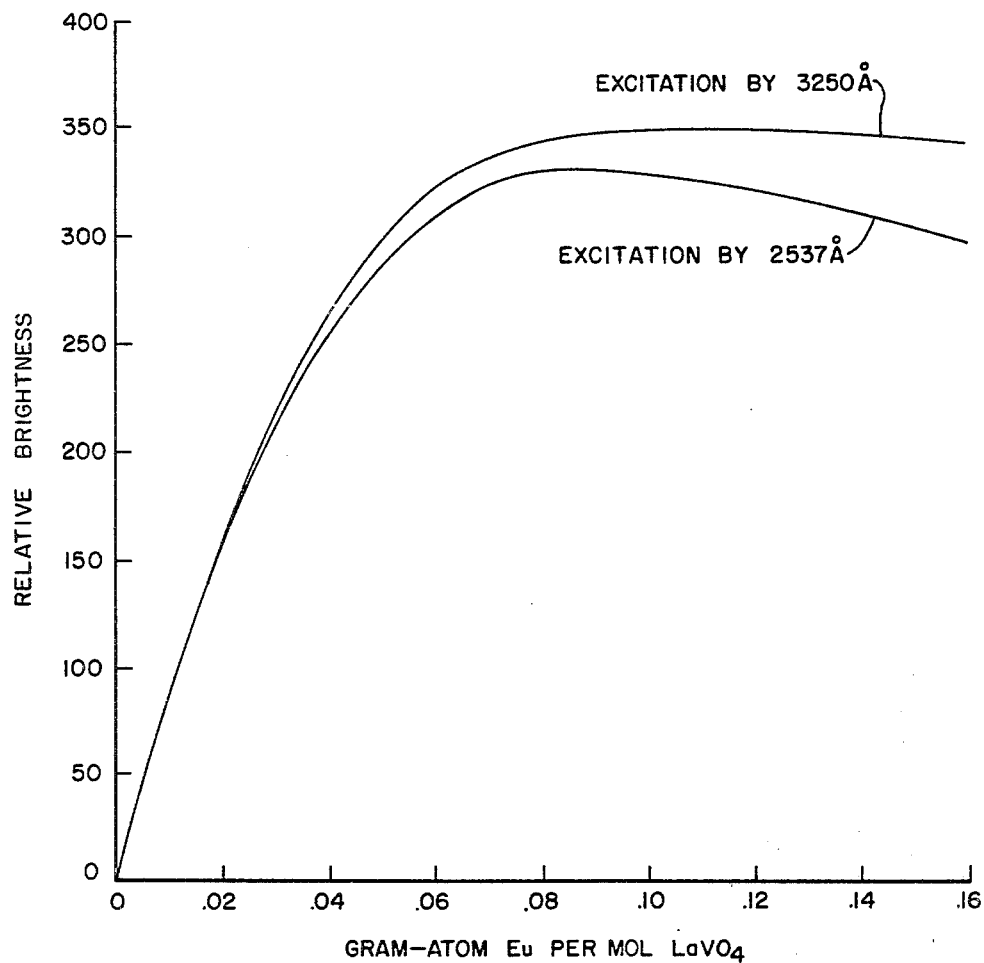

3,485,768
METHOD OF PREPARING EUROPIUM-ACTIVATED LANTHANUM VANADATE PHOSPHOR
Richard C. Ropp, North Caldwell, N.J., assignor to Westinghouse Electric Corporation, Pittsburgh, Pa., a corporation of Pennsylvania
Filed June 29, 1967, Ser. No. 650,097
Int. Cl. C09k 1/44
U.S. Cl. 252—301.4         5 Claims

ABSTRACT OF THE DISCLOSURE

To prepare improved europium-activated lanthanum vanadate phosphor, particularly for use with discharge devices or color television screens, lanthanum and europium in the desired proportions are precipitated as oxalates. Vanadium oxide is added to the oxalate precipitate along with a sodium vanadate flux. This initial mixture is fired to form the phosphor and the sodium vanadate flux separated therefrom. The resulting phosphor is then mixed with a small amount of alkaline-earth metal chloride or bromide flux and the resulting mixture is again fired in order to improve the crystallinity of the phosphor. The alkaline-earth metal halide flux is then separated from the phosphor.

BACKGROUND OF THE INVENTION

This invention relates to particular phosphors for use in high-pressure mercury-vapor lamps, low-pressure mercury-vapor lamps, cathode ray tubes, or X-ray tubes and, more particularly, to a method for producing improved lanthanum vanadate phosphor compositions which have a bright red emission.

In Patent No. 3,152,085 is described a europium or dysprosium-activated yttrium vanadate phosphor suitable for optical maser applications. Rare-earth activated lanthanum vanadate phosphors are disclosed by F. C. Pallilla in the Journal of the Electrochemical Society 112, 776 (1965). These lanthanum vanadate phosphors are stated to have efficiencies much lower than the yttrium vanadate phosphor and, as an example, europium-activated lanthanum vandate is stated to possess an efficiency only 25% that of europium-activated yttrium vanadate when excited by cathode rays or ultraviolet radiation. This relatively poor efficiency for the lanthanum vanadates is attributed to differences in structure between lanthanum vanadate and yttrium vanadate. It would of course be desirable to utilize lanthanum in place of the yttrium since the former is much less costly than the latter.

It is the general object of this invention to provide a method for making europium-activated lanthanum vanadate phosphor which is very efficient.

It is another object to provide a method for making a europium-activated lanthanum vanadate phosphor in order to induce the growth of particles of very high crystallinity in the phosphor in order that its output will be improved.

It is a further object to provide a method for making europium-activated lanthanum vanadate phosphor which has a particle size particularly adapted for use with discharge devices or cathode ray tube screens, and which particles have a very high degree of crystallinity.

SUMMARY

The foregoing objects of the invention, and other objects which will become apparent as the description proceeds, are achieved by providing a method for making europium-activated lanthanum vanadate phosphor wherein there is first prepared a solution of a predetermined amount of lanthanum-containing compound and europium-containing compound, with the relative gramatom rations of europium to lanthanum being that ratio desired in the phosphor. The europium and lanthanum are precipitated from the solution as oxalates and the precipitate has mixed therewith a predetermined amount of vanadium oxide. There is also added to the mixture a small amount of sodium vanadate flux, and the resulting mixture is fired, preferably in an oxidizing atmosphere, in order to form the phosphor. Thereafter the sodium vanadate flux is separated from the formed phosphor, and there is mixed with the residual phosphor a small amount of alkaline-earth metal chloride or bromide flux. The resulting second mixture is fired in an atmosphere comprising oxygen in order to improve the crystallinity of the phosphor and after firing, the alkaline-earth metal halide flux is separated from the phosphor.

BRIEF DESCRIPTION OF THE DRAWING

For a better understanding of the invention, reference should be made to the sole figure wherein phosphor brightness is plotted versus activator concentration.

DESCRIPTION OF THE PREFERRED EMBODIMENTS

The present phosphor can be expressed by the formula $La_x(VO_4)y:Eu_z$, where when $x+z=1.00$, $y$ is from about 0.75 ot 1.005, and $z$ is from 0.05 to 0.15. In preparing this phosphor, there is first prepared a solution of a predetermined amount of lanthanum-containing compound and europium-containing compound wherein the relative gram-atom ratio of europium to lanthanum in the solution is that ratio desired in the phosphor. As a practical matter, the gram-atom ratio of europium to lanthanum in the solution will be from about 0.05/0.95 to 0.15/0.85, and preferably from about 0.07/0.93 to 0.13/0.87. As an example, 325.80 grams of $La_2O_3$ and 35.20 grams of $Eu_2O_3$ are slowly added to 400 ml. of concentrated nitric acid, heating gently if required to dissolve the oxides completely. This solution is then diluted to a total volume of 2500 ml.

In order to precipitate the rare-earth constituents from the foregoing nitrate solution, there is prepared a 10% by weight oxalic acid solution and the rare-earth nitrate solution and the oxalic acid solution are both heated to 80° C. The oxalic acid solution is then slowly added to the rare-earth nitrate solution until excess oxalic acid results. This causes the rare-earth metals to precipitate as oxalates and the precipitate is allowed ot settle and is washed by decantation and resuspension. It is then separated and dried for 24 hours at 105° C.

As an alternative method for precipitating the rare-earth metals as oxalates, the rare-earth oxides are dissolved as previously outlined and the resulting nitrate solution is cooled to room temperature and 600 ml. of diethyl oxalate is added thereto. The mixture is stirred and heated at a moderate rate until it reaches 75–80° C., for example, where it is held for a period of one hour. The diethyl oxalate slowly decomposes under these conditions and a homogeneous precipitation of the rare-earth oxalates results. The washing and drying steps as outlined hereinbefore are then followed. An oxalate method for coprecipitation of rare-earth metals is disclosed in copending application Ser. No. 474,102, filed July 22, 1965, and owned by the present assignee.

In the next step of preparation, 931.2 grams of the coprecipitated oxalates (the assay is 42.52% oxides and the apparent molecular weight is 360.00, which includes 1.00 mole $La_2O_3$ and 0.100 mole $Eu_2O_3$) has added thereto 181.9 grams $V_2O_5$ and 24.4 grams $NaVO_3$. The amount of vanadium oxide which is added is so selected that the metallic constituents of vanadium oxide, lanthanum oxalate and europium oxalate are present in the mixture in the relative gram-atom proportions as are desired in the final phosphor. The amount of sodium vanadate which is added to this mixture is relatively small and is not critical, and the purpose of the sodium vanadate is to serve as a flux. While there are various types of sodium vanadates, it is preferred to use the metavanadate, although the other sodium vanadates could be used, if desired. In addition, while vanadium oxides of varying formulations are known and any can be used, the pentoxide is preferred.

In explanation of the term flux, it has long been known that the use of material which has a relatively low melting point and forms a liquid phase at relatively moderate temperatures, can cause recrystallization of the different material with which it is used without entering into the chemical reaction. Such a material is called a flux. However, when vanadates are prepared by solid-state reaction of the oxides, the use of fluxes does not appear to promote crystal growth and normally, phosphors made by firing the oxalates, or compounds which decompose to form the oxides, and vanadium oxide are no more crystalline than those prepared by firing the oxides alone. In accordance with the present invention, the combination of the sodium vanadate flux together with the oxalates does have a marked effect on promoting crystallinity in the phosphor.

The foregoing mixture of oxalates, vanadium oxide and sodium vanadate is blended together and hammer-milled. This mixture is placed in an uncovered silica crucible and fired for 4 hours at a temperature of 1100° C. in an air atmosphere. The firing temperature is not particularly critical and the firing time is not critical, but as a practical matter the initial firing temperature is from 700° C. to 1400° C. with a firing time of at least two hours. It is preferred to fire in an atmosphere comprising oxygen, such as air, in order to control valence of the activator when the phosphor is formed during this firing. Since a second firing is used, however the first firing could be conducted in other than an atmosphere comprising oxygen since the valence state of the activator (presumably +3) will be determined by the last firing step. The function of the first firing is to form the separate crystals of the phosphor and in the presence of the sodium vanadate and oxalate compounds, the resulting material has a reasonably high degree of crystallinity.

After the first firing, the resulting phosphor is cooled and then washed in deionized water. This removes the sodium vanadate flux and the resulting phosphor is dried overnight at a temperature of 105° C., for example.

In the next step of processing, there is added to the phosphor a small predetermined amount of alkaline-earth metal chloride or bromide flux. These bromides or chlorides serve to enhance still further the crystallinity of the resulting phosphor. As an example, there is added to the lanthanum vanadate phosphor 10% by weight of finely divided calcium chloride. Alternatively, strontium, magnesium or barium chlorides or bromides could be used in place thereof, as well as mixtures of these materials. The resulting mixture is thoroughly mixed by grinding and refired in an atmosphere comprising oxygen, preferably air, for four hours at a temperature of 1200° C. This firing temperature is not particularly critical, but as a practical matter, the firing temperature is from 700° C. to 1350° C. with a firing time of at least two hours. Upon cooling, the phosphor is again washed in water in order to remove the flux and then dried.

The resulting phosphor has a bright red emission under excitation either by ultraviolet or cathode rays. It is suitable for use in high-pressure mercury discharge lamps or low-pressure discharge lamps or in conjunction with color television or X-ray tubes. The brightness and performance of the phosphor is comparable to the europium-activated yttrium vanadate, although its cost is substantially less. The particle size of the phosphor can vary about 4.0 microns to 35.0 microns, depending upon the firing temperature and times. For use in conjunction with discharge devices, a particle size of about 15.0 microns appears to be very desirable, and for use in conjunction with color television tubes, a particle size of about 11.0 microns appears to be very desirable.

In preparing the foregoing phosphor, the final composition, can vary substantially and still produce excellent results. For example, the phosphor formulation can be expressed as indicated hereinbefore $La_x(VO_4)_y:Eu_z$, and when $x+z=1.00$, $y$ can vary from 0.75 to 1.0005 and $z$ can vary from about 0.05 to 0.15. The effect on phosphor emission with varying activator concentrations is shown in the sole figure of the drawing. The phosphor embodiments were individually excited by 2537 A.U. and 3250 A.U. in taking the illustrated brightness curves. It is preferred that when $x+z=1.00$, $y$ will be from 0.95 to 0.99 and $z$ will be from 0.07 to 0.13.

In copending application Ser. No. 650,098, filed concurrently herewith, by the inventor herein and assigned to the same assignee as the present invention, is disclosed dysprosium-activated lanthanum or yttrium or gadolinium vanadates wherein the phosphors are prepared by firing in particular alkaline-earth metal fluxes or alkali-metal fluxes. In the case of the phosphor of the present invention, however, it is necessary to utilize the combination firing first with the sodium vanadate flux, then with the alkaline-earth metal flux.

It will be recognized that the objects of the invention have been achieved by providing an improved method for producing europium-activated lanthanum vanadate phosphor which is particularly adapted for use in conjunction with discharge devices, either of the low pressure or high pressure type, or in conjunction with color television or X-ray tubes.

What is claimed is:
1. The method of making europium-activated lanthanum vanadate phosphor of the general formula

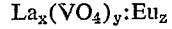

$$La_x(VO_4)_y:Eu_z$$

wherein when $x$ plus $z$ is unity, $y$ is from about 0.75 to 1.005, and $z$ is from about 0.05 to 0.15, which method comprises:
 (a) preparing a solution consisting essentially of a predetermined amount of lanthanum-containing compound and europium-containing compound wherein the relative gram-atom ratio of europium to lanthanum in the solution is that ratio desired in the phosphor;
 (b) coprecipitating said lanthanum and said europium from said solution as oxalates;
 (c) separating said precipitate and forming a first mixture by mixing with said precipitate a predetermined amount of vanadium oxide, with the total amounts of vanadium oxide, lanthanum oxalate and europium oxalate which are present in said first mixture being such that the metallic constituents thereof are present in the relative gram-atom amounts as are desired in said phosphor, and also including in said first mixture a relatively small amount of first flux consisting essentially of sodium vanadate;
 (d) firing said first mixture at a predetermined temperature and for a sufficient time to form said phosphor;
 (e) separating said sodium vanadate flux from the formed phosphor;
 (f) forming a second mixture by mixing with the phosphor a small predetermined amount of a second flux consisting essentially of at least one alkaline-earth metal chloride or bromide flux;
 (g) firing said second mixture in an atmosphere comprising oxygen at a predetermined temperature and for a sufficient time to improve the crystallinity of said phosphor; and (h) separating said alakaline-earth metal halide flux from said phosphor.

2. The method as specified in claim 1, wherein the relative gram-atom ratio of europium to lanthanum in the initially prepared solution is from 0.05/0.95 to 0.15/0.85, said vanadium oxide is added as the pentoxide to said co-precipitated oxalates in such amount that the ratio of gram-atoms of vanadium to total lanthanum plus europium is from 0.75/1 to 1.005/1, said sodium vanadate is included in said initial mixture as the orthovanadate, said initial mixture is fired in an atmosphere comprising oxygen at a temperature of from 700° C. to 1400° C. for at least two hours, said sodium vanadate is separated from said phosphor after initial firing by a water wash, said phosphor then has added thereto said second flux, in the form of alkaline-earth metal chloride or bromide, and the resulting mixture is fired in an atmosphere comprising oxygen at a temperature of from 700° C. to 1350° C. for at least two hours, and said halide flux is then removed by dissolving in water.

3. The method as specified in claim 2, wherein the vanadium oxide is added to said coprecipitated oxalates in such amount that the ratio of gram-atoms of vanadium to total lanthanum plus europium is from 0.95/1 to 0.99/1, and both of said firing atmospheres are an air atmosphere.

4. The method as specified in claim 3, wherein the relative gram-atom ratio of europium to lanthanum in the initially prepared solution is from about 0.07/0.93 to about 0.13/0.87.

5. The method as specified in claim 4, wherein said initial mixture is fired in an air atmosphere at a temperature of about 1100° C. for about four hours, and said second mixture is fired in an air atmosphere at a temperature of about 1100° C. for about four hours.

References Cited
UNITED STATES PATENTS

| | | | |
|---|---|---|---|
| 3,152,085 | 10/1964 | Ballman et al. | 252—301.4 |
| 3,322,682 | 5/1967 | Thompson | 252—301.4 |
| 3,368,980 | 2/1968 | Avella et al. | 252—301.4 |

TOBIAS E. LEVOW, Primary Examiner

ROBERT D. EDMONDS, Assistant Examiner